US010070171B2

(12) United States Patent
Higa

(10) Patent No.: US 10,070,171 B2
(45) Date of Patent: Sep. 4, 2018

(54) USER INTERFACE NAVIGATION ASSISTANCE SYSTEMS AND METHODS

(71) Applicant: Verizon Patent and Licensing Inc., Arlington, VA (US)

(72) Inventor: George M. Higa, Plano, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 720 days.

(21) Appl. No.: 14/579,958

(22) Filed: Dec. 22, 2014

(65) Prior Publication Data
US 2016/0179463 A1 Jun. 23, 2016

(51) Int. Cl.
*H04N 21/422* (2011.01)
*H04N 21/45* (2011.01)
*G09B 21/00* (2006.01)
*G06F 3/16* (2006.01)
*H04N 21/482* (2011.01)
*H04N 21/466* (2011.01)

(52) U.S. Cl.
CPC ....... *H04N 21/42204* (2013.01); *G06F 3/167* (2013.01); *G09B 21/006* (2013.01); *H04N 21/42213* (2013.01); *H04N 21/42222* (2013.01); *H04N 21/4532* (2013.01); *H04N 21/4667* (2013.01); *H04N 21/4821* (2013.01)

(58) Field of Classification Search
CPC .............. G06F 3/167; G09B 21/006; H04N 21/42222; H04N 21/42213; H04N 21/4532; H04N 21/4667; H04N 21/4821
See application file for complete search history.

(56) References Cited

U.S. PATENT DOCUMENTS

| | | | | |
|---|---|---|---|---|
| 2010/0333163 A1* | 12/2010 | Daly | .................... | H04N 5/4403 725/133 |
| 2011/0197237 A1* | 8/2011 | Turner | ............... | H04N 21/2343 725/78 |
| 2012/0148217 A1* | 6/2012 | Ellis | ........................ | H04H 60/31 386/297 |
| 2014/0232944 A1* | 8/2014 | Walker | ............. | H04N 21/42204 348/734 |
| 2015/0248887 A1* | 9/2015 | Wlodkowski | ........... | G10L 17/22 704/246 |

* cited by examiner

Primary Examiner — Oleg Asanbayev
Assistant Examiner — Akshay Doshi

(57) ABSTRACT

An exemplary method includes a user interface navigation assistance system detecting user input representative of an impending selection of a button of a remote control device associated with a media content processing device while a navigable user interface is being displayed by the media content processing device on a display screen, determining a current position of a selector object within the navigable user interface, and providing, based on the current position of the selector object, audio feedback that indicates an action that will occur if the user selects the button of the remote control device while the selector object is in the current position. Corresponding methods and systems are also disclosed.

20 Claims, 9 Drawing Sheets

# USER INTERFACE NAVIGATION ASSISTANCE SYSTEMS AND METHODS

BACKGROUND INFORMATION

Remote control devices are often used to interact with set-top box devices and other types of media content processing devices. For example, a user may press one or more buttons included in a directional pad ("D-pad") of a remote control device to navigate a selector object within a user interface (e.g., an interactive program guide) provided by a media content processing device for display on a display screen (e.g., a television). When the selector object is positioned over a desired option displayed within the user interface, the user may press another button (e.g., an "OK" button) on the remote control device in order to direct the media content processing device to perform an action associated with the option.

The particular action performed by a media content processing device in response to a selection of a button on a remote control device may vary depending on an on-screen context within which the button is selected. As used herein, an "on-screen context" may refer to what is being displayed on a display screen associated with the media content processing device when the button is selected (e.g., the particular user interface being displayed on the display screen when the button is selected), a position of a selector object within a user interface being displayed on the display screen when the button is selected, and/or any other presentation state of the media content processing device as may serve a particular implementation.

Some users of a media content processing device can readily ascertain the on-screen context (e.g., by reading and/or otherwise viewing what is being displayed on the display screen) when they are about to select a button of a remote control device. However, other users (e.g., visually impaired users and/or users who do not know how to read) may have difficulty ascertaining an on-screen context before selecting a button of a remote control device. Hence, these users may not know what action will be performed by a media content processing device every time they select the button. This may lead to user frustration, a reluctance to access content provided by way of the media content processing device, and/or missed viewing opportunities.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF PREFERRED EMBODIMENTS

Figure 1:
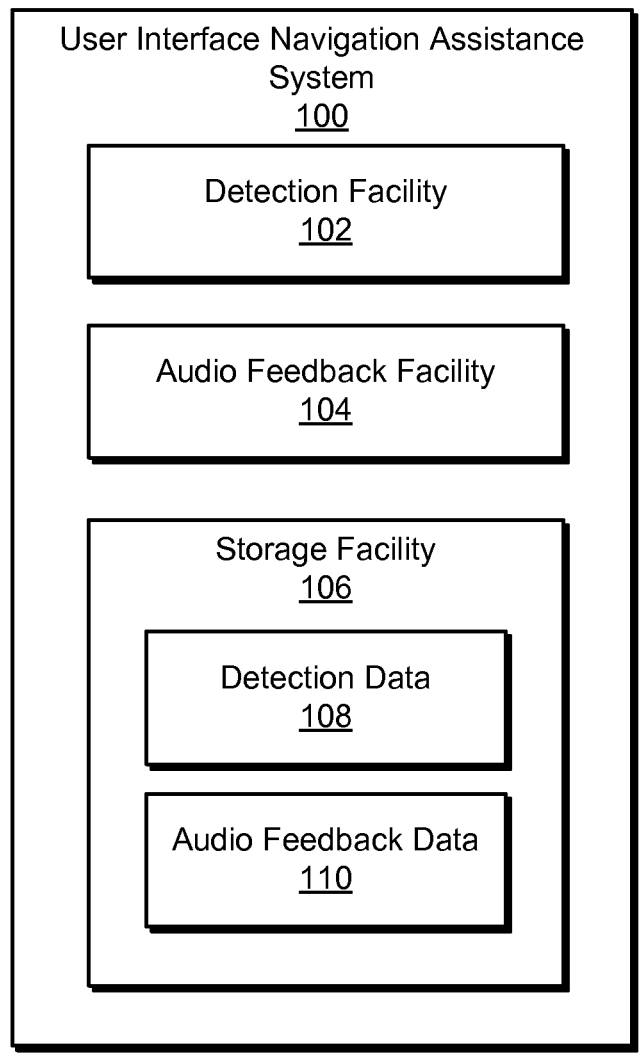
FIG. 1 illustrates an exemplary user interface navigation assistance system according to principles described herein.

Exemplary user interface navigation assistance systems and methods are described herein. As will be described in more detail below, an exemplary user interface navigation assistance system may detect user input provided by a user and representative of an impending selection of a button of a remote control device associated with (e.g., in communication with) a media content processing device while a navigable user interface is being displayed by the media content processing device on a display screen. In response to the detected user input, the user interface navigation assistance system may determine a current position of a selector object within the navigable user interface and, based on the current position of the selector object, provide audio feedback that indicates an action that will occur if the user selects the button of the remote control device while the selector object is in the current position.

As an example, a visually impaired user may desire to access a media program included within an interactive program guide by using a remote control device associated with a set-top box device that provides the interactive program guide for display on a television. Ordinarily, the user would struggle to navigate within the interactive program guide because of the user's difficulty in seeing what is displayed on the television. However, the user interface navigation assistance system described herein may allow the user to effectively navigate within the interactive program guide by providing guidance in the form of audio feedback. For example, as the user provides input representative of an impending selection of a button of the remote control device (e.g., as the user touches a button of the remote control device without pressing down upon the button), the user interface navigation assistance system may provide audio feedback to indicate to the user what will occur within the interactive program guide if the user selects (e.g., presses down upon) the button. By providing such feedback, the user interface navigation assistance system may allow the user to more fully interact with the media content processing device, which, in turn, may result in the user having a more effective and enjoyable media content consumption experience.

As another example, the user interface navigation assistance system may detect the user input representative of the impending selection of the button of the remote control device and determine the current position of the selector object as described above. In this example, the user interface navigation assistance system may identify, based on the current position of the selector object, an option that is accessible within the user interface and a sequence of actual button selections beginning with an actual selection of the button that are needed to access the option. The user interface navigation assistance system may then provide audio feedback that describes the option and identifies the sequence of actual button selections needed to access the option.

To illustrate, a visually impaired user may be navigating within an interactive program guide when he or she provides input representative of an impending selection of an "OK" button of a remote control device. In response, the user interface navigation assistance system may determine a current position of a selector object within the interactive program guide. The user interface navigation assistance system may determine, based on the current position of the selector object, that the user may select an option to purchase an on-demand media program entitled "Friday Night Fights" by pressing the "OK" button twice in succession. The user interface navigation assistance system may then provide audio feedback similar to the following: "To purchase on-demand access to 'Friday Night Fights', press the OK button twice." In this manner, the user interface navigation assistance system may audibly notify the user of various options that are available within the interactive program guide even before the user navigates to those options.

Exemplary user interface navigation assistance systems and methods will now be described with reference to the drawings.

FIG. 1 illustrates an exemplary user interface navigation assistance system 100 ("system 100") configured to assist a user in interacting with a media content processing device. As shown, system 100 may include, without limitation, a detection facility 102, an audio feedback facility 104 ("feedback facility 104"), and a storage facility 106 selectively and communicatively coupled to one another. Any suitable communication technologies, including any of the communication technologies mentioned herein, may be employed to facilitate communications between facilities 102-106.

Although facilities 102-106 are shown to be discrete facilities in FIG. 1, facilities 102-106 may be combined into fewer facilities, such as into a single facility, or divided into more facilities as may serve a particular implementation. Additionally or alternatively, one or more of the facilities 102-106 may be omitted from and external to system 100 in other implementations. For example, storage facility 106 may be external of and communicatively coupled to system 100 in certain alternative implementations.

Storage facility 106 may store detection data 108 and audio feedback data 110. Detection data 108 may include data generated and/or used by detection facility 102. Audio feedback data 110 may include data used and/or generated by feedback facility 104. Storage facility 106 may maintain additional or alternative data as may serve a particular implementation.

Detection facility 102 may detect various types of user input provided by a user by way of a remote control device. For example, detection facility 102 may detect user input representative of an impending selection of a button of a remote control device associated with a media content processing device while a navigable user interface (e.g., an interactive program guide, a menu, etc.) is being displayed on a display screen by the media content processing device. In some examples, a user may provide user input representative of an "impending" selection of a button of a remote control device when the user desires to know what selecting the button will cause the media content processing device to do before the user actually selects the button. In alternative examples, a user may provide user input representative of an "impending" selection of a button of a remote control device when the user desires to know what option(s) are available if the user selects the button followed by a selection of one or more buttons. Each of these scenarios will be described in more detail below.

Detection facility 102 may detect user input representative of an impending selection of a button of a remote control device in any suitable manner. For example, detection facility 102 may detect user input representative of an impending selection of a button of a remote control device by detecting that a user is touching the button of the remote control device (e.g., that a finger of the user is in contact with but not pressing down upon the button with sufficient force that the button is depressed or otherwise selected). To this end, detection facility 102 may utilize a touch sensor (e.g., a capacitive sensor) included in the remote control device. For example, the touch sensor may sense that the user is touching a button of the remote control device and transmit data indicating that the user is touching the button to detection facility 102. Detection facility 102 may receive the data and determine, based on the data, that the user is touching the button.

Additionally or alternatively, detection facility 102 may detect user input representative of an impending selection of a button of a remote control device by detecting that a finger of the user is hovering above a surface of the button of the remote control device without touching the surface of the button (i.e., that the finger is in a "hover state"). Detection facility 102 may detect that the finger is in a hover state in any suitable manner. For example, detection facility 102 may utilize a capacitive sensor included in the remote control device to detect the hover state.

Additionally or alternatively, detection facility 102 may detect user input representative of an impending selection of a button of a remote control device by detecting a user-initiated action predefined as being representative of the impending selection of the button. For example, system 100 may predefine a double-tapping of a button as being representative of an impending selection of the button. In this example, detection facility 102 may detect user input representative of an impending selection of the button by detecting a user-initiated double-tapping of the button.

Additionally or alternatively, detection facility 102 may detect user input representative of an impending selection of a button of a remote control device by detecting one or more spoken words associated with the button of the remote control device (e.g., one or more spoken words indicating a name of the button and/or an action associated with the button). For example, a user may speak the words "what will happen if I press the OK button." Detection facility 102 may detect the spoken words and use a speech recognition heuristic to determine that the spoken words are indicative of an impending selection of an "OK" button included in a D-pad of the remote control device.

In addition to detecting user input representative of an impending selection of a button of a remote control device, detection facility 102 may detect user input representative of an actual selection of the button of the remote control device. This may be performed in any suitable manner. For example, detection facility 102 may detect an actual selection of a button of a remote control device by detecting that a user presses down upon (e.g., depresses) the button of the remote control device with a force greater than a predetermined force threshold. Additionally or alternatively, detection facility 102 may detect an actual selection of a button of a remote control device by detecting one or more spoken words that indicate an actual selection of the button of the remote control device. For example, after listening to audio feedback provided in response to an impending selection of an "OK" button of the remote control device, a user may speak the words "select OK." Detection facility 102 may detect the spoken words and use a speech recognition heuristic to determine that the spoken words are indicative of an actual selection of the "OK" button.

Feedback facility 104 may perform one or more audio feedback operations. For example, in response to detection facility 102 detecting user input representative of an impending selection of a button of a remote control device associated with a media content processing device while a navigable user interface is being displayed by the media content processing device on a display screen, feedback facility 104 may determine a current position of a selector object within the navigable user interface. This may be performed in any suitable manner. For example, in scenarios in which feedback facility 104 is separate from the media content processing device (i.e., not implemented by the media content processing device), feedback facility 104 may determine the current position of the selector object within the navigable user interface by transmitting a request to the media content processing device for data representative of the current position of the selector object within the navigable user interface (e.g., data identifying a particular cell or option that the selector object is positioned over at the time the user provides the user input representative of the impending selection of the button) and receiving the requested data from the media content processing device. In scenarios in which feedback facility 104 is implemented by the media content processing device, feedback facility 104 may determine the current position of the selector object by maintaining and accessing data representative of the current position of the selector object.

Once feedback facility 104 determines the current position of the selector object within the navigable user interface, feedback facility 104 may provide, based on the current position of the selector object, audio feedback that indicates an action that will occur if the user selects the button of the remote control device while the selector object is in the current position. As will be described in more detail below, the audio feedback may include one or more audible words that describe the action that will occur if the user selects the button of the remote control device while the selector object is in the current position.

Feedback facility 104 may provide the audio feedback in any suitable manner. For example, feedback facility 104 may provide the audio feedback by way of a speaker included in or otherwise communicatively coupled to the remote control device. Additionally or alternatively, feedback facility 104 may provide the audio feedback by way of a speaker connected (either directly or indirectly) to the media content processing device. For example, feedback facility 104 may provide the audio feedback by way of a speaker included in or otherwise connected to a television or other type of display device that is connected to the media content processing device.

Feedback facility 104 may additionally or alternatively identify, based on the current position of the selector object within the navigable user interface, an option that is accessible within the navigable user interface (e.g., an option that is accessible if the user selects a sequence of one or more buttons after the user selects the button that is the subject of the impending selection). Exemplary options include, but are not limited to, an option to play a media program, an option to record a media program, and an option to purchase a media program.

Feedback facility 104 may also identify a sequence of actual button selections needed to access the identified option. For example, feedback facility 104 may identify one or more buttons that need to be selected by the user subsequent to the user selecting the button that is the subject of the impending selection in order to access the identified option. Feedback facility 104 may then provide, while the user is providing the user input representative of the impending selection of the button, audio feedback that describes the option and identifies the sequence of actual button selections needed to access the option.

Feedback facility 104 may identify an option that is accessible within the navigable user interface in any suitable manner. For example, feedback facility 104 may use the current position of the selector object to identify a plurality of options within the navigable user interface that are accessible if the user selects the button that is the subject of the impending selection and then selects at least one of the button and one or more other buttons of the remote control device. Feedback facility 104 may predict, based on an interaction profile and/or a user profile associated with the user, that the user will potentially be interested in a particular option included in the plurality of options. Feedback facility 104 may then designate the particular option as the identified option.

As used herein, an "interaction profile" associated with a user represents a history of how the user interacts with the media content processing device. The interaction profile associated with the user may be dynamically updated by feedback facility 104 as feedback facility 104 detects the occurrence of one or more "interaction events" performed by or otherwise associated with the user. Such interaction events may include viewing, purchasing, or otherwise accessing media content presented by the media content processing device, accessing one or more options available within one or more navigable user interfaces provided by the media content processing device, and/or otherwise interacting with the media content processing device and/or media content presented by the media content processing device. In this manner, the interaction profile associated with a user may be dynamically updated over time to reflect how the user interacts with the media content processing device.

As used herein, a "user profile" associated with a user represents one or more personal traits associated with the user that are not already defined within an interaction profile associated with the user. For example, a user profile maintained or otherwise accessed by feedback facility 104 may include data representative of a user's age, gender, income level, profession, family status, nationality, preferred genre of media content, preferred personnel (e.g., actors, directors, and/or characters), preferred media content channels, etc.

Feedback facility 104 may use an interaction profile associated with a user to predict that the user will potentially be interested in a particular option in any suitable manner. For example, an interaction profile associated with a user may indicate that the user typically selects a "record" option after selecting an entry representative of a particular media program. Based on this information, if a user provides user input representative of an impending selection of an "OK" button while a selector object is positioned over an entry representative of a media program within an interactive program guide, feedback facility 104 may provide audio feedback that identifies a sequence of actual button selections needed to select an option to record the media program. For example, if the media program is entitled "Eyewitness News at 5:00", the audio feedback may be similar to the following: "If you press this button, you will access programming information for Eyewitness News at 5:00. To record this program, press the OK button twice."

Feedback facility 104 may use a user profile associated with a user to predict an option that the user will potentially be interested in in any suitable manner. For example, a user profile associated with a user may indicate that the user lives in Texas. Based on this information, if a user provides user input representative of an impending selection of an "OK" button while a selector object is positioned over an entry representative of a media program category of "football" within an interactive program guide, feedback facility 104 may provide audio feedback that identifies a sequence of actual button selections needed to access an option to view a football game that involves a team from Texas. For example, the audio feedback may be similar to the following: "Select this button to view available football games scheduled for broadcast today. To see the Dallas Cowboys football game, press the OK button, then the right arrow button twice, then the OK button again."

Figure 2:
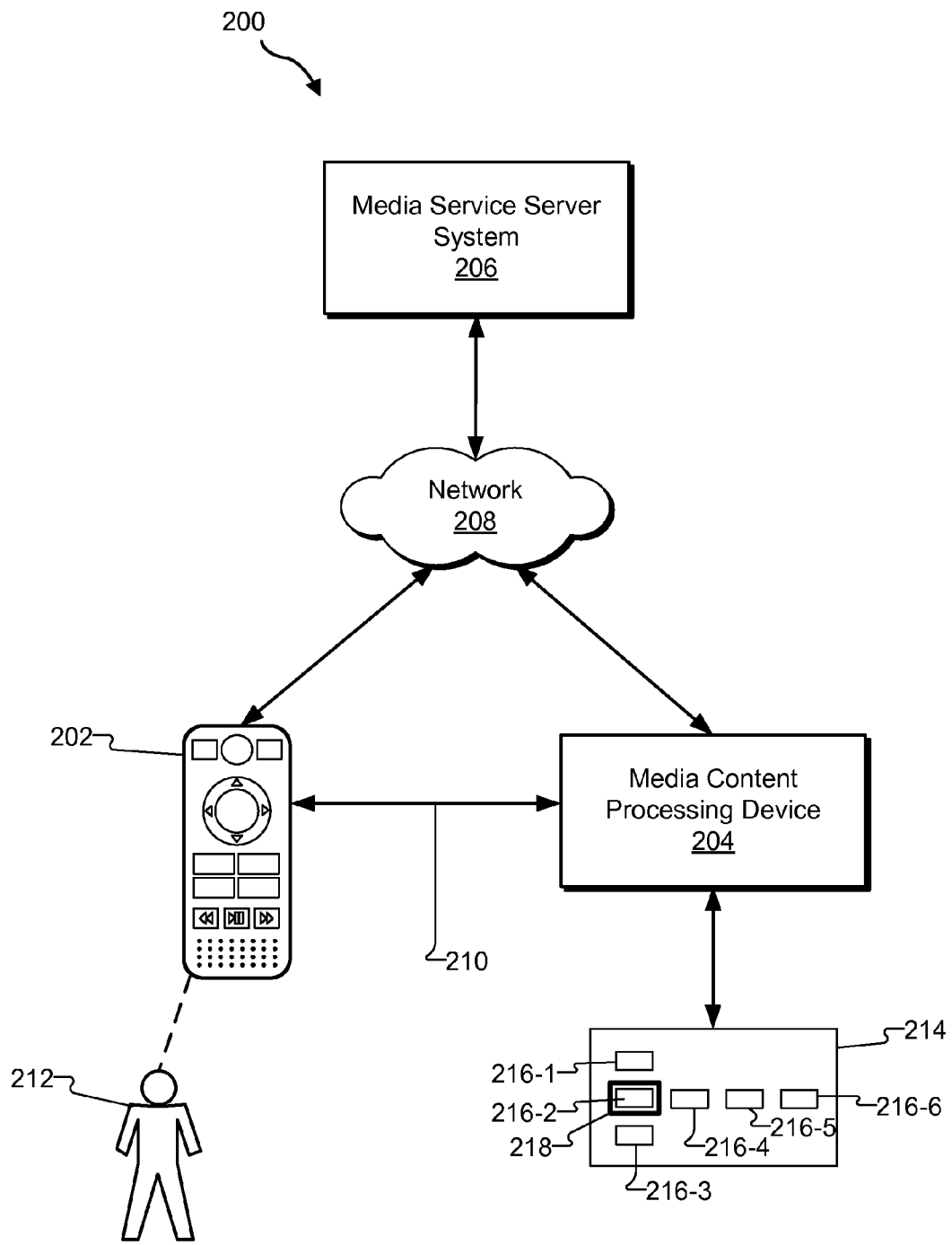
FIG. 2 illustrates an exemplary implementation of the system of FIG. 1 according to principles described herein.

FIG. 2 illustrates an exemplary implementation 200 of system 100 wherein a remote control device 202, a media content processing device 204, and a media service server system 206 ("server system 206") are communicatively coupled by way of a network 208. In implementation 200, any of facilities 102-106 of system 100 may be implemented entirely by remote control device 202, entirely by media content processing device 204, entirely by server system 206, or distributed across remote control device 202, media content processing device 204, and/or server system 206.

Remote control device 202, media content processing device 204, and server system 206 may communicate using any communication platforms and technologies suitable for transporting data and/or communication signals, including know communication technologies, devices, media, and protocols supportive of remote communications, examples of which include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Global System for Mobile Communications ("GSM") technologies, Evolution Data Optimized Protocol ("EVDO"), Time Division Multiple Access ("TDMA") technologies, radio frequency ("RF") signaling technologies, wireless communication technologies (e.g., Bluetooth, Wi-Fi, etc.), Code Division Multiple Access ("CDMA") technologies, in-band and out-of-band signaling technologies, subscriber and/or proprietary television network communication technologies, and other suitable communications technologies.

Network 208 may include, but is not limited to, one or more subscriber television networks, wireless networks (Wi-Fi networks), wireless communication networks, mobile telephone networks (e.g., cellular telephone networks), mobile phone data networks, broadband networks, narrow-band networks, the Internet, local area networks, wide area networks, live television transmission networks, and any other networks capable of carrying media content, data, and/or communications signals between remote control device 202, media content processing device 204, and server system 206. Communications between remote control device 202, media content processing device 204, and server system 206 may be transported using any of the above listed networks, or any combination or sub-combination of the above listed networks.

Additionally or alternatively, remote control device 202, media content processing device 204, and server system 206 may communicate using one or more direct connections between remote control device 202, media content processing device 204, and server system 206. For example, FIG. 2 shows that remote control device 202 and media content processing device 204 may communicate by way of a direct connection 210 (e.g., an infrared and/or any other type of wireless connection).

Server system 206 may include one or more server-side computing devices. Server system 206 may be associated with (e.g., managed by) a provider of network 208 and/or any other entity. For example, server system 206 may be associated with a subscriber television network provider and may provide media content (e.g., media programs) to media content processing device 204 for experiencing by a user 212.

Remote control device 202 may include any suitable remote control device configured to detect user input provided by a user 212 and control an operation of media content processing device 204 in accordance with the user input (e.g., by transmitting one or more commands associated with the user input to media content processing device 204). In some examples, remote control device 202 may include one or more buttons that may be selected (e.g., pressed) by a user in order to control the operation of media content processing device 204.

Media content processing device 204 may include any computing device configured to provide media content (e.g., media content transmitted thereto by server system 206) for experiencing by a user (e.g., user 212). For example, media content processing device 204 may include a set-top box, a digital video recording ("DVR") device, a television, a gaming console, a personal media player, a home media network gateway device, etc. In some examples, media content processing device 204 is controllable by remote control device 202.

Server system 206 and/or media content processing device 204 may perform one or more operations to provide a media service (e.g., a subscriber television media service) to user 212. For example, media content processing device 204 may provide a navigable user interface 214 through which user 212 may interact with the media service (e.g., by providing input by way of remote control device 202). Through navigable user interface 214, user 212 may access the media service, such as by accessing one or more features of the media service and/or media content accessible through the media service. Navigable user interface 214 may be displayed on any suitable display screen (e.g., a television screen) accessible by user 212 and communicatively connected to media content processing device 204.

As shown, navigable user interface 214 may, in some examples, include a plurality of selectable entries 216 (e.g., selectable entries 216-1 through 216-6) displayed therein. A selector object 218 may also be displayed within navigable user interface 214. Selector object 218 may include a box or any other graphical object that highlights or otherwise selects a particular entry. For example, selector object 218 is shown to be positioned over entry 216-2. As will be described below, a user may move selector object 218 within navigable user interface 214 by providing input commands by way of remote control device 202.

Various user interface navigation assistance examples in accordance with the systems and methods described herein will now be provided.

Figure 3:
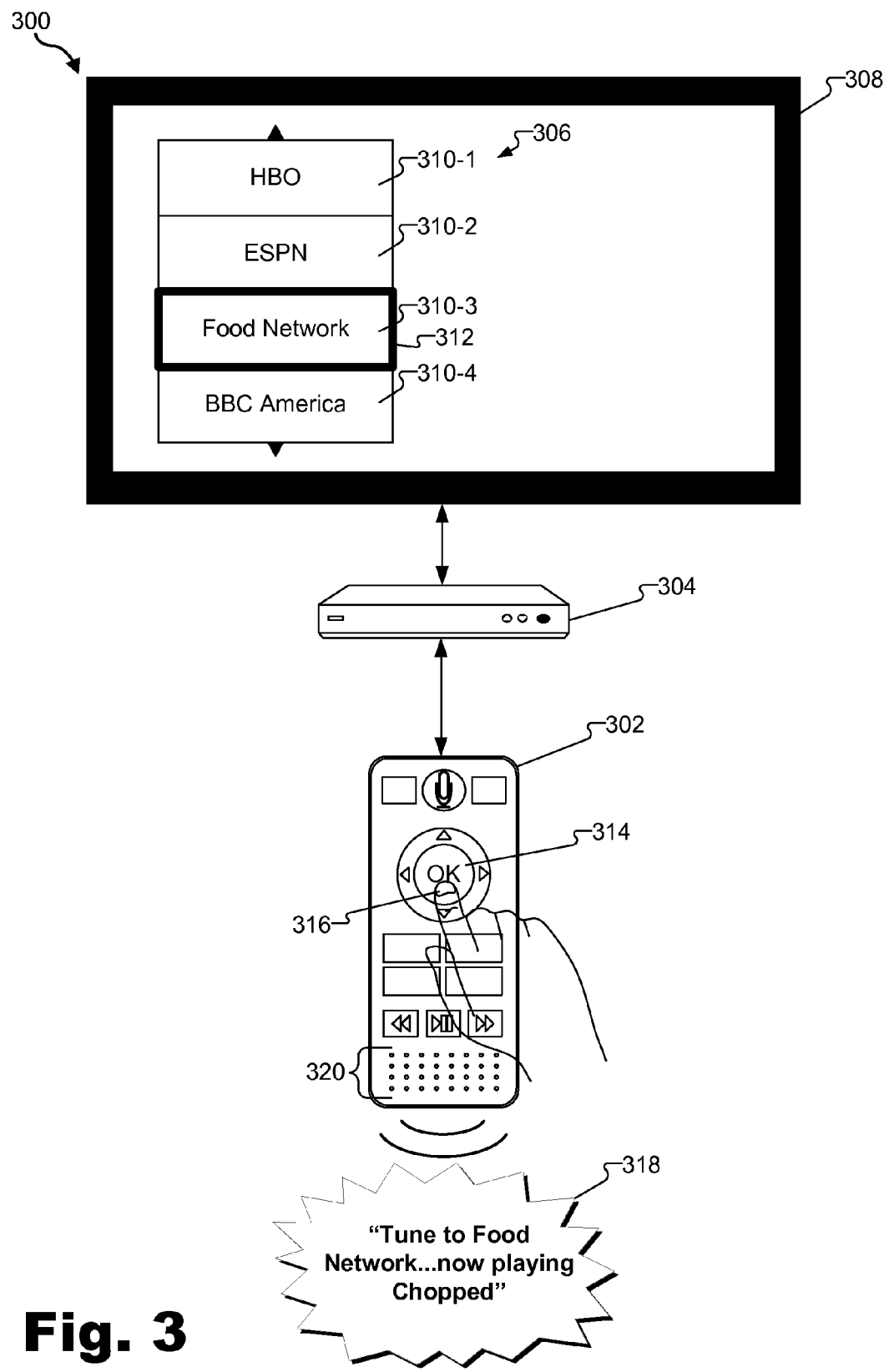
FIGS. 3-6 illustrate various configurations in accordance with the methods and systems described herein.

FIG. 3 shows an exemplary configuration 300 in which a remote control device 302 may be used to control an operation of a media content processing device 304 that is providing a navigable user interface 306 for display on a display screen 308 (e.g., a television screen). In configuration 300, remote control device 302 may communicate with media content processing device 304 by way of a direct wireless connection (e.g., an infrared connection), a local area network (e.g., a Wi-Fi network), and/or in any other suitable manner.

In the example of FIG. 3, navigable user interface 306 includes an interactive programming guide that includes a plurality of entries 310 (e.g., entries 310-1 through 310-4) representative of a plurality of television channels that are available for access by way of media content processing device 304. As shown in FIG. 3, a selector object 312 is currently positioned over entry 310-3, which represents a television channel entitled "Food Network".

In some examples, a user operating remote control device 302 may desire to know what will happen if he or she selects an "OK" button 314 included on remote control device 302. For example, the user may be visually impaired and not able to read the text displayed in entry 310-3.

To this end, the user may provide input representative of an impending selection of the "OK" button 314 of remote control device 302. For example, the user may place a finger 316 on (e.g., touch) the "OK" button 314 without pressing down upon the "OK" button 314. System 100 may detect (e.g., by way of a touch sensor included in remote control device 302) that the finger 316 of the user is touching the "OK" button 314, and thereby determine that the touch is representative of an impending selection by the user of the "OK" button 314.

In response to detecting that the finger 316 of the user is touching the "OK" button 314, system 100 may determine a current position of selector object 312 within navigable user interface 306. In this particular example, system 100 may determine that selector object 312 is positioned over entry 310-3 while the user is touching the "OK" button 314. Based on this determination, system 100 may provide audio feedback that indicates an action that will occur if the user actually selects the "OK" button 314 (e.g., by pressing down on the "OK" button 314). For example, as shown in FIG. 3, system 100 may direct remote control device 302 to output audio feedback 318 by way of a speaker 320 included in remote control device 302 that audibly indicates to the user that if the user selects the "OK" button 314, media content processing device 304 will tune to the television channel entitled "Food Network" and begin presenting a television program entitled "Chopped". Audio feedback 318 may additionally or alternatively be provided by way of a speaker that is a part of or otherwise connected to media content processing device 304, display screen 308, and/or any other electronic device as may serve a particular implementation. If the user provides additional user input representative of an actual selection of the "OK" button 314 (e.g., by pressing down on the "OK" button 314 with finger 316), system 100 may direct media content processing device 304 to perform the action indicated in audio feedback 318.

Figure 4:
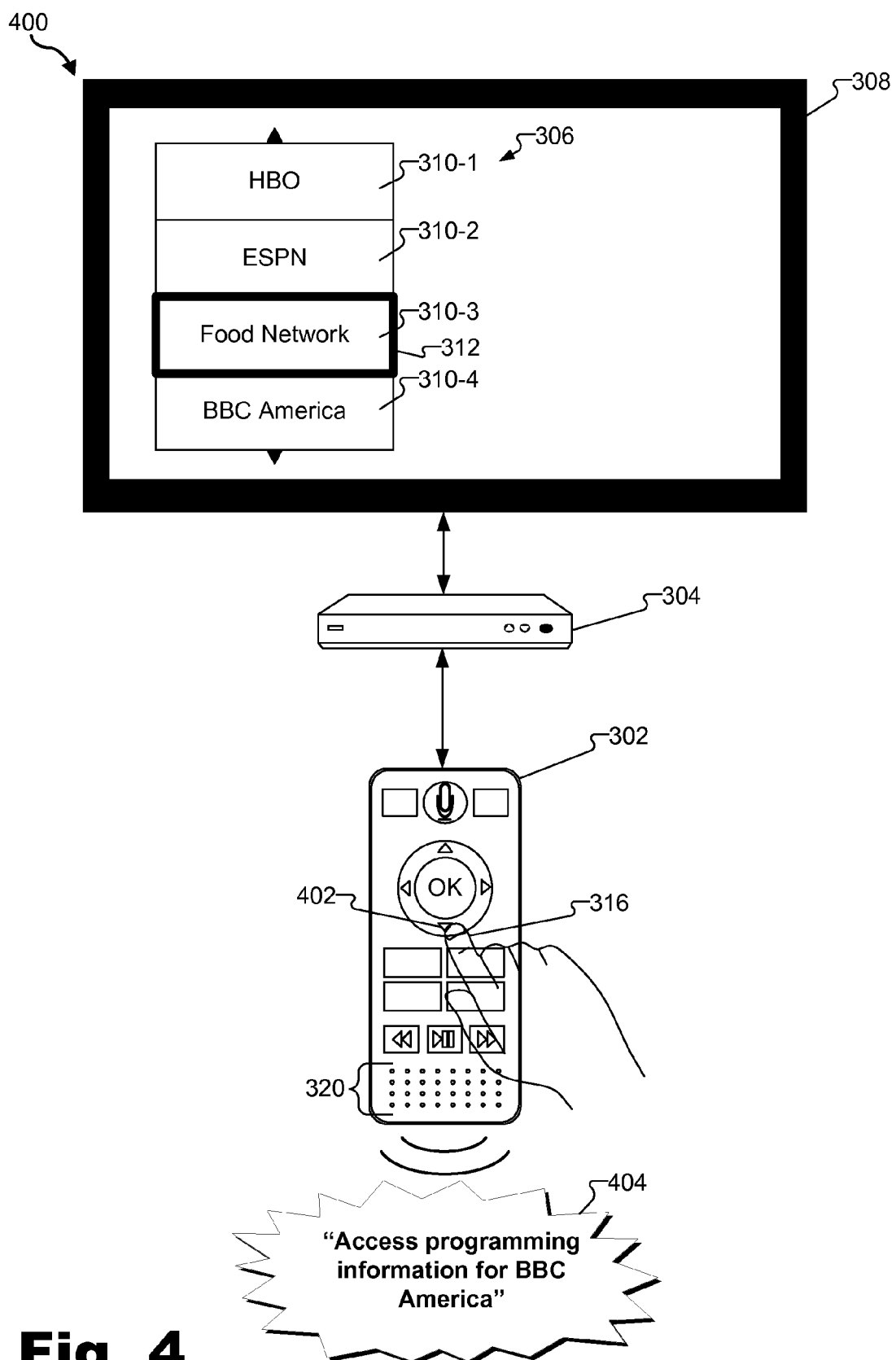

The user may subsequently desire to know what will happen if the user selects a different button of remote control device 302. For example, FIG. 4 shows a configuration 400 that is similar to configuration 300, except that in configuration 400 the user has positioned finger 316 such that it is touching a "down arrow" button 402 of remote control device 302. In response to detecting this impending selection of the "down arrow" button 402, system 100 may, based on the current position of selector object 312, direct remote control device 302 to output audio feedback 404 by way of speaker 320 included in remote control device 302 that audibly indicates to the user that if the user selects the "down arrow" button 402, media content processing device 304 will display programming information for the channel entitled "BBC America". Audio feedback 404 may additionally or alternatively be provided by way of a speaker that is a part of or otherwise connected to media content processing device 304, display screen 308, and/or any other electronic device as may serve a particular implementation.

Figure 5:
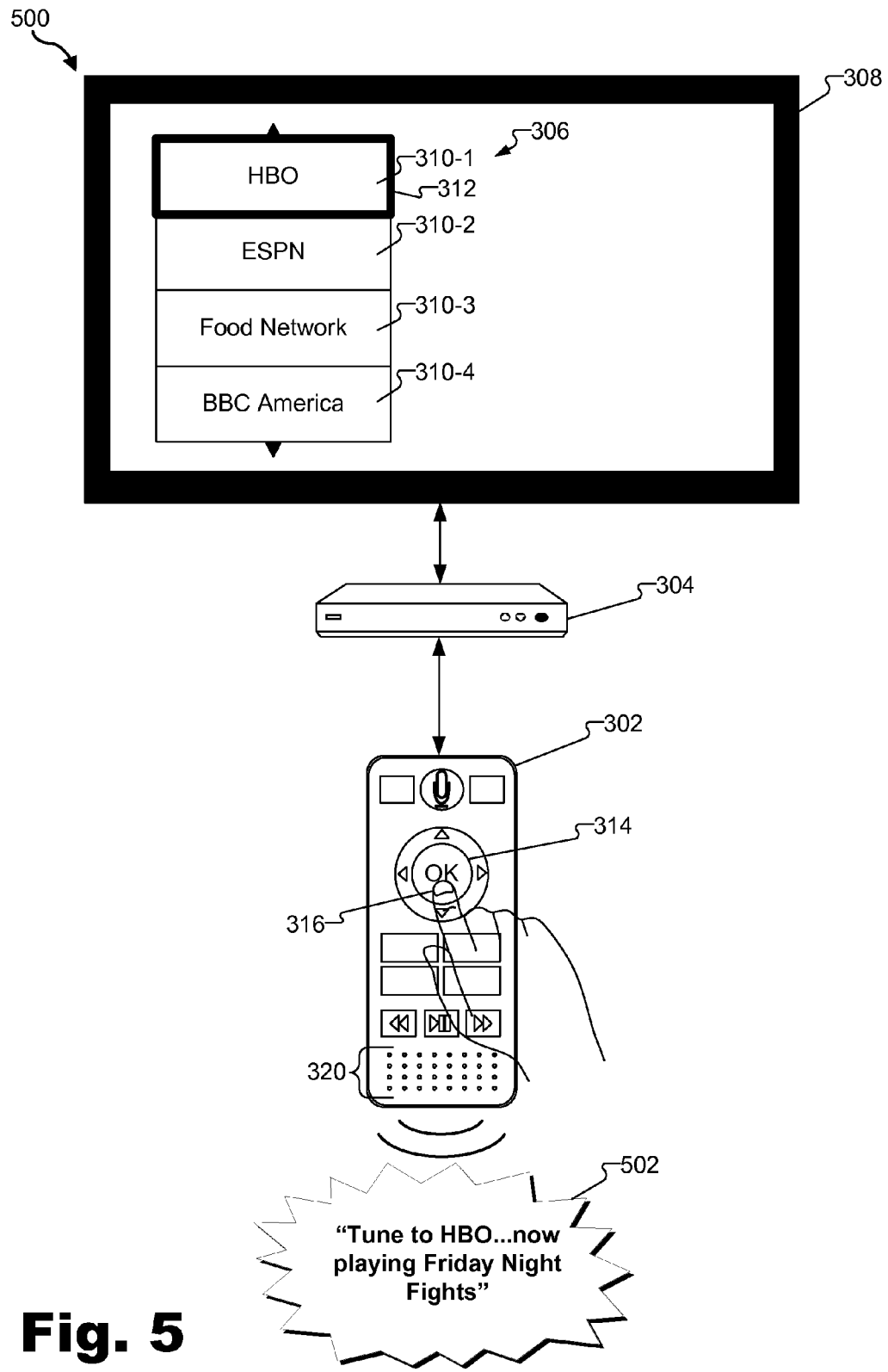

FIG. 5 illustrates an exemplary configuration 500 in which selector object 312 has moved from being positioned over entry 310-3 to being positioned over entry 310-1. In this configuration, an actual selection of the "OK" button 314 will cause media content processing device 304 to perform a different action than in configuration 300. System 100 may detect this movement of selector object 312. If the user provides user input representative of an impending selection of the "OK" button 314 while selector object is positioned over entry 310-1, system 100 may accordingly direct remote control device 302 to output audio feedback 502 by way of speaker 320 included in remote control device 302 that audibly indicates to the user that if the user selects the "OK" button 314, media content processing device 304 will tune to the television channel entitled "HBO" and begin presenting a television program entitled "Friday Night Fights". Audio feedback 502 may additionally or alternatively be provided by way of a speaker that is a part of or otherwise connected to media content processing device 304, display screen 308, and/or any other electronic device as may serve a particular implementation.

In some examples, the audio feedback provided by system 100 in response to user input representative of an impending selection of a particular button of a remote control device may notify the user of an option that the user may access if the user selects a sequence of buttons beginning with the particular button.

Figure 6:
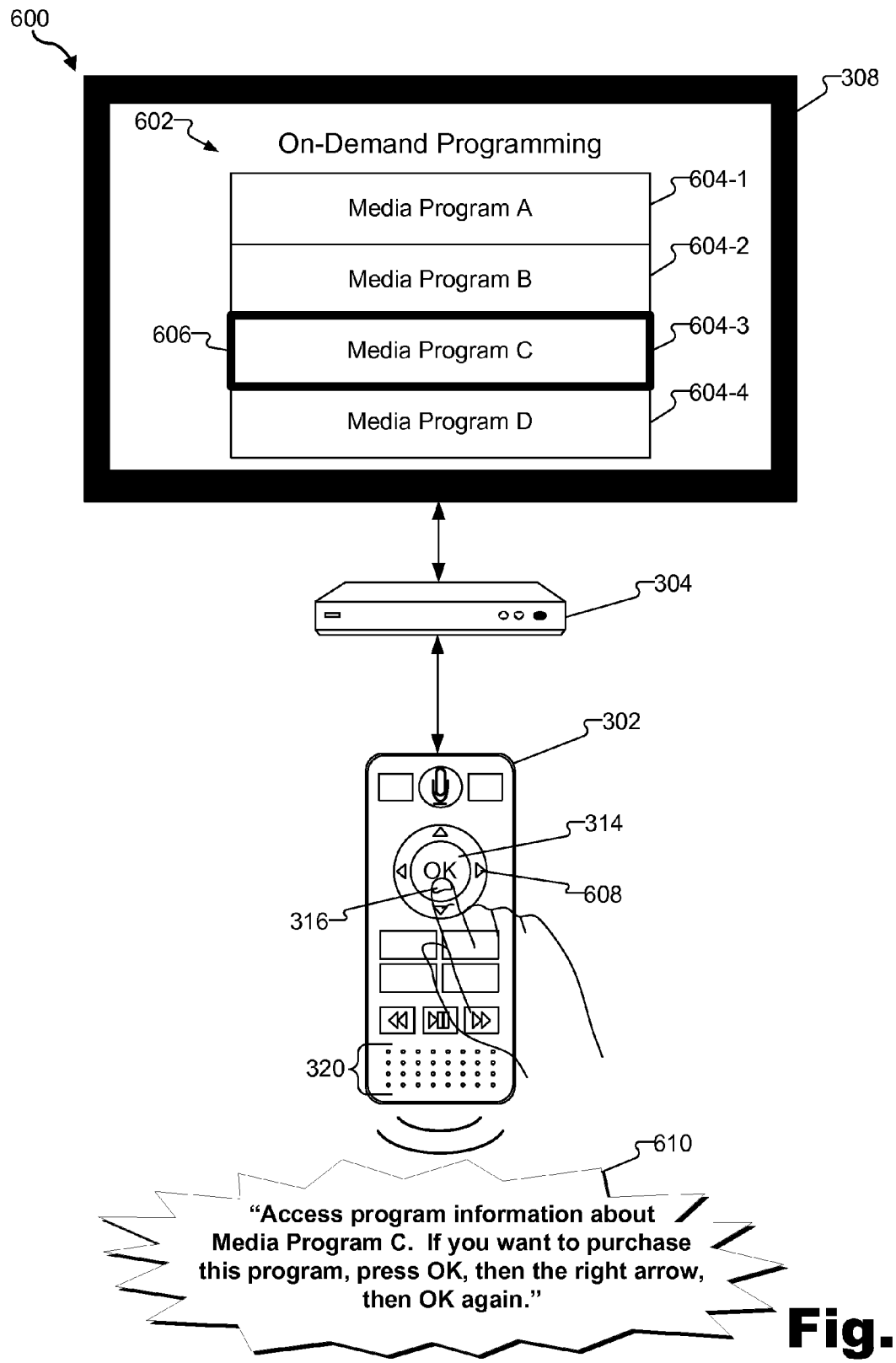

FIG. 6 shows an exemplary configuration 600 in which system 100 provides audio feedback that identifies a sequence of actual button selections needed to access a particular option included in a navigable user interface. Configuration 600 is similar to the configurations shown in FIGS. 3-5, except that an on-demand programming navigable user interface 602 is displayed within display screen 308.

As shown, on-demand programming navigable user interface 602 includes a plurality of entries 604 (e.g., entries 604-1 through 604-4) representative of a plurality of on-demand media programs available for access by way of media content processing device 304. As shown in FIG. 6, a selector object 606 is currently positioned over entry 604-3, which represents an on-demand media program entitled "Media Program C".

While selector object 606 is positioned over entry 604-3, the user may provide input representative of an impending selection of "OK" button 314 of remote control device 302, as described above. System 100 may detect the user input, and, in response, predict that the user may be interested in purchasing the media program entitled "media program C". This prediction may be made in accordance with an interaction profile and/or a user profile associated with the user, as described above.

Based on the prediction, system 100 may identify a sequence of actual button selections needed to access the purchase option. In this example, system 100 may determine that the user first needs to press the "OK button" 314 to access a second layer of the on-demand programming navigable user interface 602. System 100 may also determine that once the second layer is displayed, a "right arrow" button 608 needs to be selected in order to move selector object 606 to the purchase option. System 100 may also determine that once selector object 606 is positioned over the purchase option, the "OK" button 314 again needs to be selected in order to select the purchase option.

Based on these determinations, system 100 may direct remote control device 302 to output audio feedback 610 by way of speaker 320 included in remote control device 302 that audibly indicates to the user that if the user wants to purchase the on-demand media program entitled "Media Program C", the user should press the "OK" button 314, then the "right arrow" button 608, then the "OK" button 314 again. In some examples, as shown in FIG. 6, audio feedback 610 may also indicate what will happen if the user selects the "OK" button 314 once (i.e., that the user will access program information about the media program entitled "Media Program C"). Audio feedback 610 may additionally or alternatively be provided by way of a speaker that is a part of or otherwise connected to media content processing device 304, display screen 308, and/or any other electronic device as may serve a particular implementation.

Figure 7:
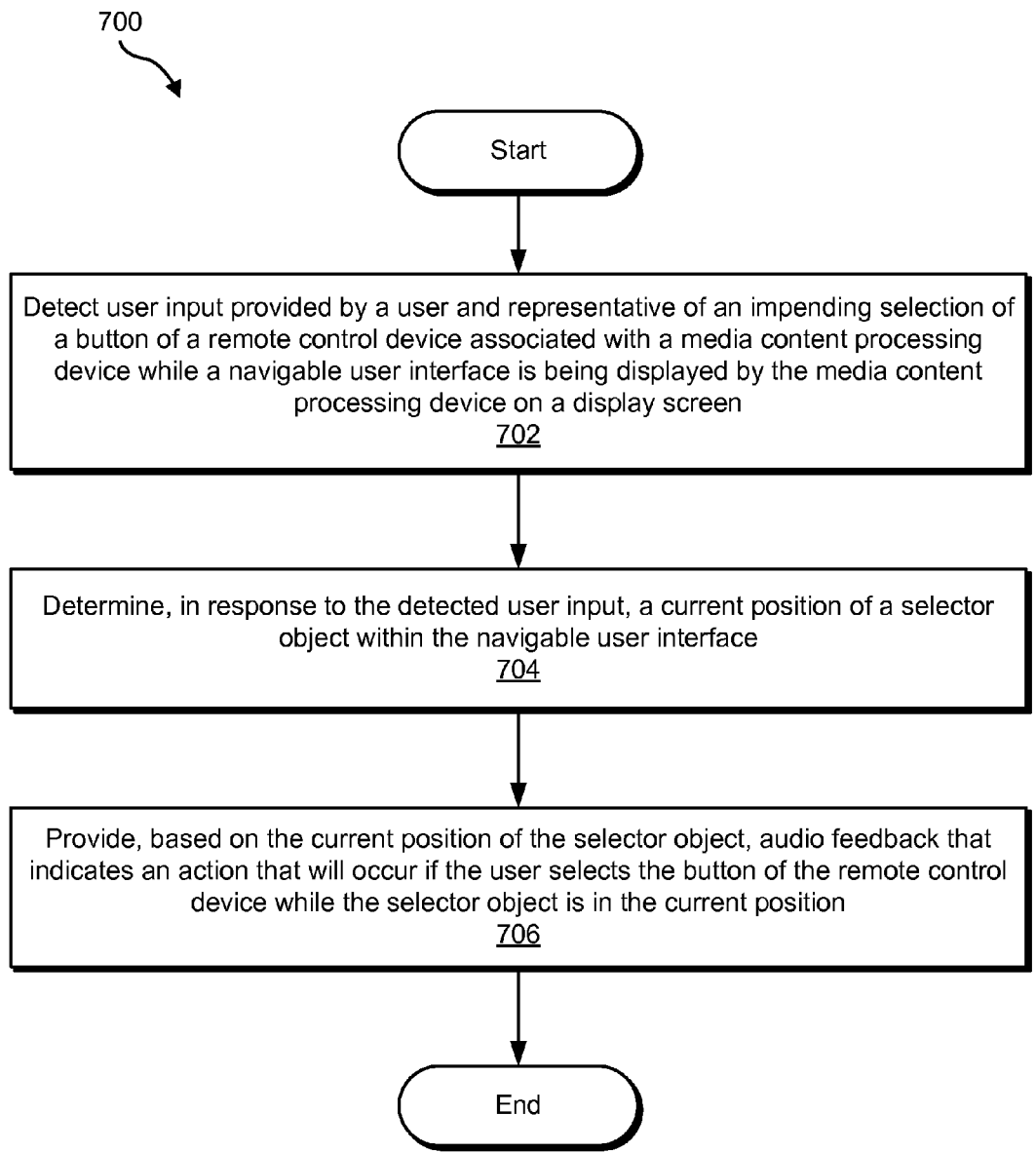
FIGS. 7-8 illustrate exemplary user interface navigation assistance methods according to principles described herein.
Figure 8:
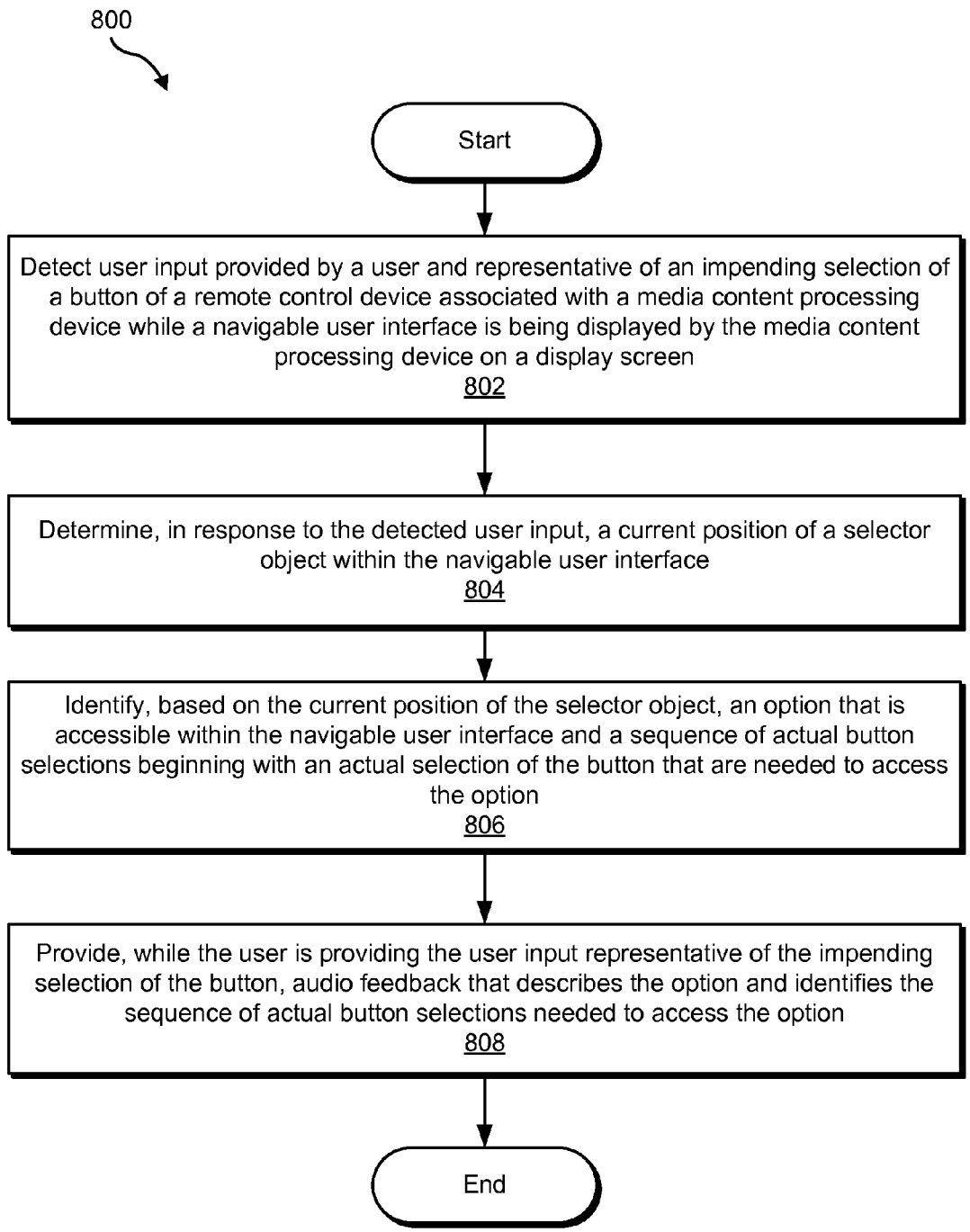

FIGS. 7-8 illustrate exemplary user interface navigation assistance methods according to principles described herein. While FIGS. 7-8 illustrate exemplary methods according to certain embodiments, other embodiments may omit, add to, reorder, combine, and/or modify any of the steps shown in FIGS. 7-8. In certain embodiments, one or more steps shown in FIGS. 7-8 may be performed by system 100 and/or one or more components or implementations of system 100.

Turning to FIG. 7, in step 702, a user interface navigation assistance system detects user input provided by a user and representative of an impending selection of a button of a remote control device associated with a media content processing device while a navigable user interface is being displayed by the media content processing device on a display screen. Step 702 may be performed in any of the ways described herein.

In step 704, the user interface navigation assistance system determines, in response to the detected user input, a current position of a selector object within the navigable user interface. Step 704 may be performed in any of the ways described herein.

In step 706, the user interface navigation assistance system provides, based on the current position of the selector object, audio feedback that indicates an action that will occur if the user selects the button of the remote control device while the selector object is in the current position. Step 706 may be performed in any of the ways described herein.

Turning to FIG. 8, in step 802, a user interface navigation assistance system detects user input provided by a user and representative of an impending selection of a button of a remote control device associated with a media content processing device while a navigable user interface is being displayed by the media content processing device on a display screen. Step 802 may be performed in any of the ways described herein.

In step 804, the user interface navigation assistance system determines, in response to the detected user input, a current position of a selector object within the navigable user interface. Step 804 may be performed in any of the ways described herein.

In step 806, the user interface navigation assistance system identifies, based on the current position of the selector object, an option that is accessible within the navigable user interface and a sequence of actual button selections beginning with an actual selection of the button that are needed to access the option. Step 806 may be performed in any of the ways described herein.

In step 808, the user interface navigation assistance system provides, while the user is providing the user input representative of the impending selection of the button, audio feedback that describes the option and identifies the sequence of actual button selections needed to access the option. Step 808 may be performed in any of the ways described herein.

In certain embodiments, one or more of the systems, components, and/or processes described herein may be implemented and/or performed by one or more appropriately configured computing devices. To this end, one or more of the systems and/or components described above may include or be implemented by any computer hardware and/or computer-implemented instructions (e.g., software) embodied on at least one non-transitory computer-readable medium configured to perform one or more of the processes described herein. In particular, system components may be implemented on one physical computing device or may be implemented on more than one physical computing device. Accordingly, system components may include any number of computing devices, and may employ any of a number of computer operating systems.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a disk, hard disk, magnetic tape, any other magnetic medium, a CD-ROM, DVD, any other optical medium, a RAM, a PROM, an EPROM, a FLASH-EEPROM, any other memory chip or cartridge, or any other tangible medium from which a computer can read.

Figure 9:
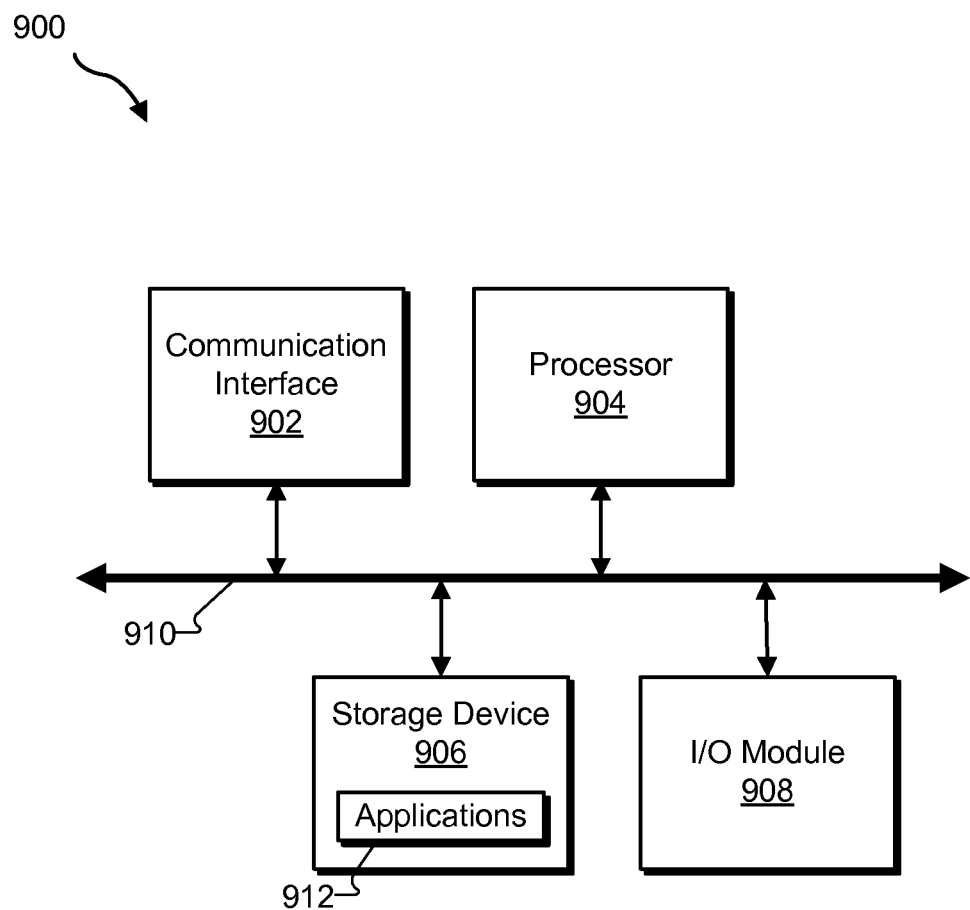
FIG. 9 illustrates an exemplary computing device according to principles described herein.

FIG. 9 illustrates an exemplary computing device 900 that may be configured to perform one or more of the processes described herein. As shown in FIG. 9, computing device 900 may include a communication interface 902, a processor 904, a storage device 906, and an input/output ("I/O") module 908 communicatively connected via a communication infrastructure 910. While an exemplary computing device 900 is shown in FIG. 9, the components illustrated in FIG. 9 are not intended to be limiting. Additional or alternative components may be used in other embodiments. Components of computing device 900 shown in FIG. 9 will now be described in additional detail.

Communication interface 902 may be configured to communicate with one or more computing devices. Examples of communication interface 902 include, without limitation, a wired network interface (such as a network interface card), a wireless network interface (such as a wireless network interface card), a modem, an audio/video connection, and any other suitable interface.

Processor 904 generally represents any type or form of processing unit capable of processing data or interpreting, executing, and/or directing execution of one or more of the instructions, processes, and/or operations described herein. Processor 904 may direct execution of operations in accordance with one or more applications 912 or other computer-executable instructions such as may be stored in storage device 906 or another computer-readable medium.

Storage device 906 may include one or more data storage media, devices, or configurations and may employ any type, form, and combination of data storage media and/or device. For example, storage device 906 may include, but is not limited to, a hard drive, network drive, flash drive, magnetic disc, optical disc, random access memory ("RAM"), dynamic RAM ("DRAM"), other non-volatile and/or volatile data storage units, or a combination or sub-combination thereof. Electronic data, including data described herein, may be temporarily and/or permanently stored in storage device 906. For example, data representative of one or more executable applications 912 configured to direct processor 904 to perform any of the operations described herein may be stored within storage device 906. In some examples, data may be arranged in one or more databases residing within storage device 906.

I/O module 908 may be configured to receive user input and provide user output and may include any hardware, firmware, software, or combination thereof supportive of input and output capabilities. For example, I/O module 908 may include hardware and/or software for capturing user input, including, but not limited to, a keyboard or keypad, a touch screen component (e.g., touch screen display), a receiver (e.g., an RF or infrared receiver), and/or one or more input buttons.

I/O module 908 may include one or more devices for presenting output to a user, including, but not limited to, a graphics engine, a display (e.g., a display screen, one or more output drivers (e.g., display drivers), one or more audio speakers, and one or more audio drivers. In certain embodiments, I/O module 908 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing device 900. For example, one or more applications 912 residing within storage device 906 may be configured to direct processor 904 to perform one or more processes or functions associated with detection facility 102 and audio feedback facility 104. Likewise, storage facility 106 may be implemented by or within storage device 906.

To the extent the aforementioned embodiments collect, store, and/or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
   detecting, by a user interface navigation assistance system, user input provided by a user and representative of an impending selection of a button of a remote control device associated with a media content processing device while a navigable user interface is being displayed by the media content processing device on a display screen, the user input representative of the impending selection of the button of the remote control device being provided before the user actually selects the button to cause the remote control device to transmit a command associated with the button to the media content processing device;
   determining, by the user interface navigation assistance system in response to the detected user input representative of the impending selection of the button of the remote control device and before the user actually selects the button to cause the remote control device to transmit the command associated with the button to the media content processing device, a current position of a selector object within the navigable user interface; and
   providing, by the user interface navigation assistance system based on the current position of the selector object and before the user actually selects the button to cause the remote control device to transmit the command associated with the button to the media content processing device, audio feedback that indicates an action that will occur if the user selects the button of the remote control device while the selector object is in the current position;
   wherein the detecting of the user input representative of the impending selection of the button of the remote control device comprises at least one of
      detecting that the user is touching the button of the remote control device without pressing down on the button with sufficient force such that the button is selected by
         receiving data from a touch sensor included in the remote control device, and
         determining, based on the received data, that the user is touching the button of the remote control device without pressing down on the button with sufficient force such that the button is selected, and
      detecting, by utilizing a capacitive sensor in the remote control device, that a finger of the user is hovering above a surface of the button without touching the surface of the button.

2. The method of claim 1, wherein the detecting of the user input representative of the impending selection of the button of the remote control device further comprises detecting one or more spoken words associated with the button of the remote control device.

3. The method of claim 1, wherein the determining of the current position of the selector object within the navigable user interface comprises:
   transmitting a request to the media content processing device for data representative of the current position of the selector object within the navigable user interface, and
   receiving the requested data from the media content processing device.

4. The method of claim 1, wherein the providing of the audio feedback comprises providing the audio feedback by way of a speaker included in the remote control device.

5. The method of claim 1, wherein the providing of the audio feedback comprises providing the audio feedback by way of a speaker connected to the media content processing device.

6. The method of claim 1, further comprising:
identifying, by the user interface navigation assistance system based on the current position of the selector object, an option that is accessible within the navigable user interface and a sequence of actual button selections beginning with an actual selection of the button that are needed to access the option; and
providing, by the user interface navigation assistance system while the user is providing the user input representative of the impending selection of the button, additional audio feedback that describes the option and identifies the sequence of actual button selections needed to access the option.

7. A method comprising:
detecting, by a user interface navigation assistance system, user input provided by a user and representative of an impending selection of a button of a remote control device associated with a media content processing device while a navigable user interface is being displayed by the media content processing device on a display screen, the user input representative of the impending selection of the button of the remote control device being provided before the user actually selects the button to cause the remote control device to transmit a command associated with the button to the media content processing device;
determining, by the user interface navigation assistance system in response to the detected user input representative of the impending selection of the button of the remote control device and before the user actually selects the button to cause the remote control device to transmit the command associated with the button to the media content processing device, a current position of a selector object within the navigable user interface;
identifying, by the user interface navigation assistance system based on the current position of the selector object, an option that is accessible within the navigable user interface and a sequence of actual button selections beginning with an actual selection of the button that are needed to access the option; and
providing, by the user interface navigation assistance system while the user is providing the user input representative of the impending selection of the button and before the user actually selects the button to cause the remote control device to transmit the command associated with the button to the media content processing device, audio feedback that describes the option and identifies the sequence of actual button selections needed to access the option;
wherein the detecting of the user input representative of the impending selection of the button of the remote control device comprises at least one of
detecting that the user is touching the button of the remote control device without pressing down on the button with sufficient force such that the button is selected by
receiving data from a touch sensor included in the remote control device, and
determining, based on the received data, that the user is touching the button of the remote control device without pressing down on the button with sufficient force such that the button is selected, and
detecting, by utilizing a capacitive sensor in the remote control device, that a finger of the user is hovering above a surface of the button without touching the surface of the button.

8. The method of claim 7, wherein the identifying of the option based on the current position of the selector object comprises:
using the current position of the selector object to identify a plurality of options within the navigable user interface that are accessible if the user selects the button and then selects at least one of the button and one or more other buttons of the remote control device;
predicting, based on at least one of a user profile associated with the user and an interaction profile that represents a history of how the user interacts with the media content processing device, that the user will potentially be interested in a particular option included in the plurality of options; and
designating the particular option as the identified option.

9. The method of claim 7, wherein the identifying of the option is further based on at least one of a user profile associated with the user and an interaction profile that represents a history of how the user interacts with the media content processing device.

10. The method of claim 7, wherein identifying of the sequence of actual button selections based on the current position of the selector object comprises identifying one or more buttons of the remote control device that need to be selected by the user subsequent to the user selecting the button in order to access the option.

11. The method of claim 7, wherein the option comprises at least one of an option to play a media program, an option to record the media program, and an option to purchase the media program.

12. The method of claim 7, wherein the determining of the current position of the selector object within the navigable user interface comprises:
transmitting a request to the media content processing device for data representative of the current position of the selector object within the navigable user interface, and
receiving the requested data from the media content processing device.

13. The method of claim 7, wherein the providing of the audio feedback comprises providing the audio feedback by way of a speaker included in the remote control device.

14. The method of claim 7, wherein the providing of the audio feedback comprises providing the audio feedback by way of a speaker connected to the media content processing device.

15. A system comprising:
at least one physical computing device that:
detects user input provided by a user and representative of an impending selection of a button of a remote control device associated with a media content processing device while a navigable user interface is being displayed by the media content processing device on a display screen, the user input representative of the impending selection of the button of the remote control device being provided before the user actually selects the button to cause the remote control device to transmit a command associated with the button to the media content processing device;
determines, in response to the detected user input representative of the impending selection of the button of the remote control device and before the user actually selects the button to cause the remote control device to transmit the command associated with the button to the media content processing device, a current position of a selector object within the navigable user interface; and provides, based on the current position of the selector object and before the user actually selects the button to cause the remote control device to transmit the command associated with the button to the media content processing device, audio feedback that indicates an action that will occur if the user selects the button of the remote control device while the selector object is in the current position;

wherein the at least one physical computing device detects the user input representative of the impending selection of the button of the remote control device by performing at least one of detecting that the user is touching the button of the remote control device without pressing down on the button with sufficient force such that the button is selected by receiving data from a touch sensor included in the remote control device, and determining, based on the received data, that the user is touching the button of the remote control device without pressing down on the button with sufficient force such that the button is selected, and detecting, by utilizing a capacitive sensor in the remote control device, that a finger of the user is hovering above a surface of the button without touching the surface of the button.

16. The system of claim 15, wherein the at least one computing device further detects the user input representative of the impending selection of the button of the remote control device by detecting one or more spoken words associated with the button of the remote control device.

17. The system of claim 15, wherein the at least one computing device determines the current position of the selector object within the navigable user interface by:

transmitting a request to the media content processing device for data representative of the current position of the selector object within the navigable user interface, and receiving the requested data from the media content processing device.

18. The system of claim 15, wherein the at least one computing device provides the audio feedback by providing the audio feedback by way of a speaker included in the remote control device.

19. The system of claim 15, wherein the at least one computing device further:

identifies, based on the current position of the selector object, an option that is accessible within the navigable user interface and a sequence of actual button selections beginning with an actual selection of the button that are needed to access the option; and provides, while the user is providing the user input representative of the impending selection of the button, additional audio feedback that describes the option and identifies the sequence of actual button selections needed to access the option.

20. The system of claim 15, wherein the at least one computing device provides the audio feedback by providing the audio feedback by way of a speaker connected to the media content processing device.

\* \* \* \* \*